United States Patent

[11] 3,589,470

| [72] | Inventor | Chester Dorn<br>Spencer, Iowa |
|---|---|---|
| [21] | Appl. No. | 860,773 |
| [22] | Filed | Sept. 24, 1969 |
| [45] | Patented | June 29, 1971 |
| [73] | Assignee | Superior Manufacturing Company<br>Spencer, Iowa |

[54] GREASE GUN ADAPTER
3 Claims, 5 Drawing Figs.

[52] U.S. Cl. ................................................ 184/1 D,
184/105 C, 141/329, 141/383
[51] Int. Cl. ................................................ F16n 21/04
[50] Field of Search .................................... 184/1, 1 D,
105, 105 B, 105 C; 141/383, 329, 311, 385; 81/3.7

[56] References Cited
UNITED STATES PATENTS

| 1,419,210 | 6/1922 | Bradford | 81/3.7 |
| 1,716,482 | 6/1929 | Bradbury | 141/383 |
| 1,718,603 | 6/1929 | Smith | 141/329 X |
| 2,130,009 | 9/1938 | Hazelip | 184/1 |
| 2,541,272 | 2/1951 | Murphy | 141/329 X |
| 2,628,518 | 2/1953 | Mitan | 81/3.7 |
| 3,486,539 | 12/1969 | Jacuzzi | 141/383 X |

FOREIGN PATENTS

| 1,151,012 | 8/1957 | France | 184/105 |

Primary Examiner—Manuel A. Antonakas
Attorney—Henderson and Strom

ABSTRACT: A grease gun adapter is provided which is mateable with a conventional grease gun coupler and frictionally engageable with a needle adapted for insertion into sealed lubricating areas. The adapter comprises a ball-shaped rearward portion mateable with the coupler, a flange rigidly affixed to the ball-shaped portion and juxtaposable with the coupler, and a tube affixed to the flange and frictionally engageable with the needle. An aperture is formed along the longitudinal axis of the adapter through the tube, the flange, and the ball-shaped portion thereby allowing grease to flow from the grease gun, through the adapter and the needle, and into the sealed lubricating areas.

PATENTED JUN29 1971

3,589,470

INVENTOR
CHESTER DORN

BY
Henderson & Strom
ATTORNEYS

GREASE GUN ADAPTER

BACKGROUND OF THE INVENTION

This invention relates to a grease gun adapter suitable for attaching a lubricating needle to a conventional grease gun coupler.

Fittings with sealed lubrication areas such as sealed bearings, sealed universal joints, pillow block bearings and the like are extensively used. On occasion, these fittings require lubricating. Grease can be injected into these sealed lubricating areas by utilizing lubricating needles; however, lubricating needles cannot now be utilized with conventional hand grease guns without the concomitant use of cumbersome and usually expensive adapters.

Devices of this general nature are disclosed in the following U.S. Patents: Mitan, U.S. Pat. No. 2,628,518; House, U.S. Pat. No. 2,614,660 Hazelip, U.S. Pat. No. 2,130,009; and Reichert, U.S. Pat. No. 2,724,858. The adapter of this invention represents an improvement in the devices illustrated above. The adapter is simple in construction, inexpensive, and readily attachable and removable from the coupler of a conventional hand grease gun.

SUMMARY OF THE INVENTION

This invention relates to an improved grease gun adapter mateable, at its rearward end, with a conventional grease gun coupler and, at its forward end, frictionally engageable in the rearward end of an elongate needle. The adapter comprises a ball-shaped rearward portion mateable with the coupler, a flange tangentially disposed and rigidly affixed to the ball-shaped rearward portion, and an elongate tube affixed centrally and normally to the flange and on the side of the flange opposite the ball-shaped rearward portion. The flange is juxtaposable with the forward end of the coupler and has a diameter at least equal to the diameter of the forward end of the coupler. The tube is tapered inwardly from its rearward end to its forward end. An aperture is formed along the axis of the adapter through the tube, the flange, and the ball-shaped rearward portion.

An object of this invention is to provide a grease gun adapter suitable for attaching an elongate needle to a conventional grease gun coupler.

Another object is to provide a grease gun adapter as described which is of simple and unitary construction, which is readily attachable and removable from a conventional grease gun coupler, and which is compact and inexpensive.

A further object is to provide a grease gun adapter as described wherein a pressure drop is effected through the adapter.

DESCRIPTION OF THE PREFERRED EMBODIMENTS

Figure 1:
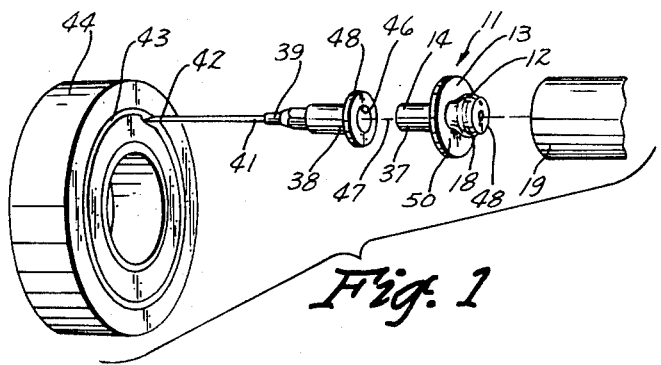
FIG. 1 is an exploded perspective view illustrating a grease gun coupler, the adapter of this invention, an elongate needle, and a sealed bearing.
Figure 2:
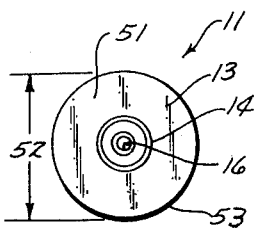
FIG. 2 is a front view of the grease gun adapter.
Figure 3:
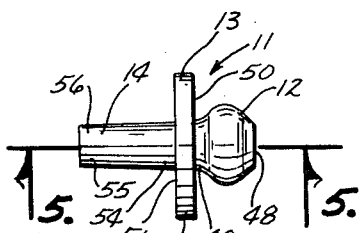
FIG. 3 is a side view of the grease gun adapter.
Figure 4:
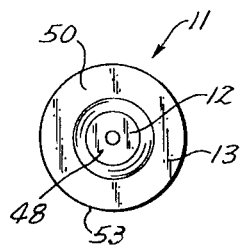
FIG. 4 is a rear view of the grease gun adapter.

Referring now to the drawings, the grease gun adapter of this invention is indicated generally at 11 in FIGS. 1—5. The grease gun adapter 11 comprises a ball-shaped rearward portion 12, a flange 13 tangentially disposed and rigidly affixed to the ball-shaped rearward portion 12 and an elongate tube 14 affixed centrally and normally of the flange 13. An aperture 16 is formed along the longitudinal axis 17 of the adapter 11 through the tube 14, the flange 13, and the ball-shaped rearward portion 12.

Figure 5:
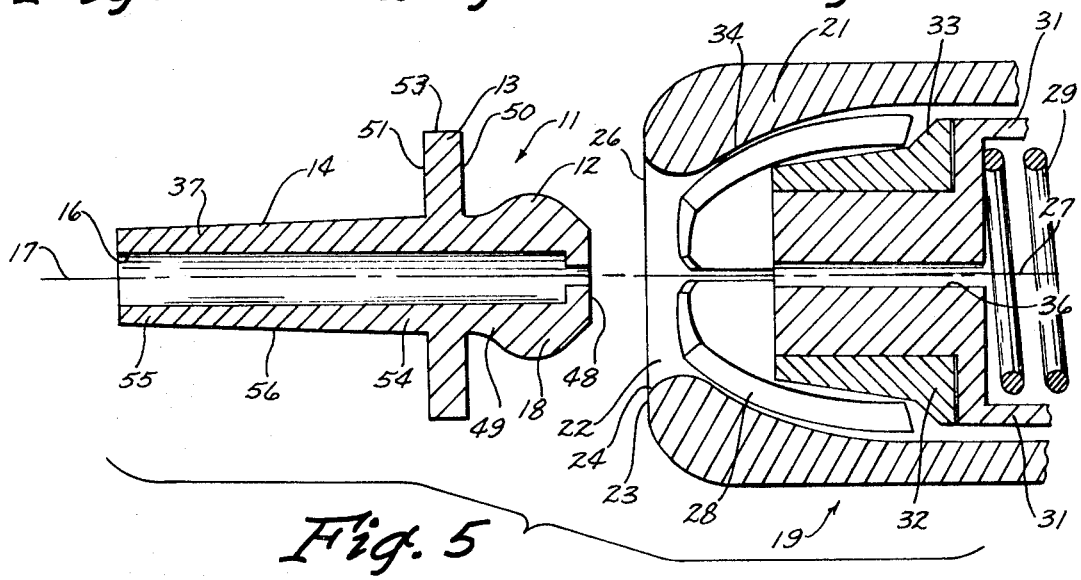
FIG. 5 is a cross-sectional side view of the grease gun adapter and a shortened cross-sectional view of a conventional grease gun coupler.

The grease gun adapter 11 is mateable, at its rearward end 18, with a conventional grease gun coupler 19 (FIG. 5). The coupler 19 comprises a body 21 having a socket 22 formed therein. The forward end 23 of the coupler 19 is a rim 24 surrounding the mouth 26 of the socket 22 and is disposed in a plane normal of the longitudinal axis 27 of the coupler 19. The coupler body 21 extends arcuately rearwardly of the forward end 23. Three clamping jaws 28 (two only shown) are secured in the coupler body 21 and are spring-biased by coil spring 29. The coil spring 29 acts on the jaws 28 through the sealing gasket 31 and washer 32. The gasket 31 and washer 32 are both slidably received in the coupler body 21. Pressure is applied against the rearward ends of jaws 28 through the beveled flange 33 of the washer 31. The inside of the rim 24 provides an arcuate portion 34 which cooperates with the forward ends of the jaws 28 so that the forward ends of the jaws 28 are thrust inwardly by the force exerted by spring 29 and thereby grasp the ball-shaped rearward portion 12.

The coupler 19 is also provided with a grease outlet port 36. The flow of grease through the port 36 is controlled by a ball valve (not shown) which cooperates with the spring 29. The coupler construction described above is well known in the art and no further explanation is deemed necessary.

At its forward end 37, the adapter 11 is frictionally engageable in the rearward end 38 of an elongate needle 39 (FIG. 1). The needle 39 comprises an elongate body 41, the forward end 42 of which is pointed to facilitate penetration of neoprene seals 43 or the like of sealed bearings 44 or other sealed lubricating areas. A longitudinal passageway 46 is formed through the needle 39 along its longitudinal axis 47 to allow grease to flow therethrough. The passageway 46 can be tapered inwardly from the rearward end 38 of the needle 39 towards the forward end 42 to facilitate frictional engagement with the forward end 37 of the adapter 11. On the rearward end 38 of the needle 39, a shoulder 48 is generally formed which extends outwardly and allows the needle 39 to be gripped and removed from the adapter 11. The construction of this needle 39 is well known in the art and no further explanation of it is deemed necessary.

The adapter 11 of this invention is specially designed to secure the grease gun coupler 19 and the needle 39 together inexpensively and compactly. Additionally, the adapter 11 is readily insertable into and removable from the coupler 19, and the adapter 11 effects a pressure drop in the grease to prevent disengagement of the needle 39 from the adapter 11.

The adapter 11 comprises a ball-shaped rearward portion 12, a flange 13, a tube 14, and an aperture 16 formed longitudinally therethrough. The ball-shaped rearward portion 12 is of generally spherical configuration and is mateable with the clamping jaws 28 of the coupler 19. The rearward end 48 (FIGS. 3—5) of the ball-shaped rearward portion 12 is flattened and disposed in a plane normal of the longitudinal axis 17 of the adapter 11. The flattened end 48 fits flush against the coupler gasket 31. The pressure exerted by the spring 29 effects a seal between the rearward end 48 of the ball-shaped rearward portion 12 and the gasket 31 thus preventing grease leakage at this juncture.

On the forward end 49 of the ball-shaped rearward portion 12, a flange 13 having a rearward side 50 and a forward side 51 is tangentially disposed and rigidly affixed. The flange 13 is of generally circular configuration and has a diameter 52 (FIG. 2) at least equal to the diameter of the forward end 23 or rim 24 of the coupler 19 which is disposed in a plane normal of the longitudinal axis 27 of the coupler 19.

By utilizing a flange 13 of these dimensions, the adapter 11 can be readily removed from the coupler 19 by sideways pressure applied to the adapter 11. The outer edge 53 of the flange 13 becomes the pivot point when removing the adapter 11 thereby lifting the ball-shaped rearward portion 12 from the clamping jaws 28.

An elongate tube 14 having a rearward end 54 and a forward end 55 is affixed at its rearward end 54 centrally and normally to the forward side 51 of the flange 13. The outside surface 56 of the tube 14 is tapered inwardly from the rearward end 54 to the forward end 55. The taper provides a larger engageable surface area on the tube 14 and increases the usefulness of the tube 14 in frictionally engaging the needle 39. The taper is preferably quite gradual to most advantageously secure the needle 39 thereon.

An aperture 16 is formed along the longitudinal axis 17 of the adapter 11 through the tube 14, the flange 13, and the ball-shaped rearward portion 12. As shown best in FIG. 5, the aperture 16 has a diameter greater at the forward end 55 of the tube than at the rearward end 48 of the ball-shaped rearward portion 12. The aperture 16 is formed in this manner to effect a pressure drop through the adapter 11 and prevent the hydraulic pressure developed in the grease from forcing the needle 39 from the adapter 11.

In a preferred embodiment of this invention, the aperture 16 formed through the rearward end 48 of the ball-shaped rearward portion 12 is substantially the same as the diameter (not shown) of the passageway 46 formed through the needle 39 at the narrowest portion thereof. This feature, again, prevents the hydraulic pressure developed in the grease from disengaging the needle 39 from the adapter 11.

Although a preferred embodiment has been described hereinbefore, it is to be remembered that various modifications may be made without departing from the invention as claimed.

I claim:

1. A grease gun adapter mateable, at its rearward end, with a conventional grease gun coupler and, at its forward end, frictionally engageable in the rearward end of an elongate needle having a passageway formed longitudinally therethrough, the forward end of the needle being adapted for insertion into sealed lubricating areas, the grease gun adapter comprising:
    a. a ball-shaped rearward portion mateable with the coupler;
    b. a flange tangentially disposed and rigidly affixed to said ball-shaped rearward portion, said flange having a diameter at least equal to the diameter of the forward end of the coupler in a plane normal of the longitudinal axis of the coupler, said flange being juxtaposable with the forward end of the coupler;
    c. an elongate tube having a rearward end and a forward end, said tube being affixed at said rearward end centrally and normally to said flange and on the side of said flange opposite said ball-shaped rearward portion, the outside surface of said tube being tapered inwardly from said rearward end to said forward end;
    d. an aperture formed along the longitudinal axis of said adapter through said tube, said flange and said rearward portion, said aperture having a diameter greater at said forward end of said tube than at the rearward end of said ball-shaped rearward portion.

2. The grease gun adapter of claim 1 wherein said rearward end of said ball-shaped rearward portion is flattened and disposed in a plane normal of the longitudinal axis of said adapter.

3. The grease gun adapter of claim 2 wherein the diameter of said aperture at said rearward end of said ball-shaped rearward portion is substantially the same as the diameter of the passageway formed through the needle at the narrowest portion thereof.